(12) United States Patent
Marjanovic et al.

(10) Patent No.: US 10,525,657 B2
(45) Date of Patent: Jan. 7, 2020

(54) GAS PERMEABLE WINDOW AND METHOD OF FABRICATING THE SAME

(71) Applicant: Corning Incorporated, Corning, NY (US)

(72) Inventors: Sasha Marjanovic, Painted Post, NY (US); Garrett Andrew Piech, Corning, NY (US); Kristopher Allen Wieland, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 523 days.

(21) Appl. No.: 15/078,097

(22) Filed: Mar. 23, 2016

(65) Prior Publication Data

US 2016/0279895 A1    Sep. 29, 2016

Related U.S. Application Data

(60) Provisional application No. 62/139,238, filed on Mar. 27, 2015.

(51) Int. Cl.
*B23B 3/24* (2006.01)
*B32B 3/26* (2006.01)
*B32B 17/06* (2006.01)

(52) U.S. Cl.
CPC .............. *B32B 3/266* (2013.01); *B32B 17/06* (2013.01); *B32B 2307/412* (2013.01); *B32B 2307/724* (2013.01)

(58) Field of Classification Search
CPC ..................................................... B32B 3/266
See application file for complete search history.

(56) References Cited

U.S. PATENT DOCUMENTS

| | | | |
|---|---|---|---|
| 1,790,397 | A | 1/1931 | Woods et al. |
| 2,682,134 | A | 6/1954 | Stookey |
| 2,749,794 | A | 6/1956 | O'Leary |
| 3,647,410 | A | 3/1972 | Heaton et al. |
| 3,695,497 | A | 10/1972 | Dear |
| 3,695,498 | A | 10/1972 | Dear |
| 3,729,302 | A | 4/1973 | Heaton |

(Continued)

FOREIGN PATENT DOCUMENTS

| | | |
|---|---|---|
| CN | 2388062 Y | 7/2000 |
| CN | 1283409 C | 11/2006 |

(Continued)

OTHER PUBLICATIONS

International Search Report and Written Opinion PCT/US2016/023381 dated Sep. 20, 2016.

(Continued)

*Primary Examiner* — William P Watkins, III
(74) *Attorney, Agent, or Firm* — Svetlana Z. Short

(57) ABSTRACT

A gas permeable glass window, suitable for use with liquid interface additive manufacturing, has an optically transparent glass article greater than about 0.5 millimeters in thickness defining a first surface and a second surface. A plurality of gas channels are disposed through the article from the first surface to the second surface. The gas channels occupy less than about 1.0% of a surface area of the article and are configured such that the article has a gas permeability between about 10 barrers and about 2000 barrers.

18 Claims, 6 Drawing Sheets

(56) References Cited

U.S. PATENT DOCUMENTS

| | | |
|---|---|---|
| 3,775,084 A | 11/1973 | Heaton |
| 4,226,607 A | 10/1980 | Domken |
| 4,441,008 A | 4/1984 | Chan |
| 4,546,231 A | 10/1985 | Gresser et al. |
| 4,646,308 A | 2/1987 | Kafka et al. |
| 4,764,930 A | 8/1988 | Bille et al. |
| 4,891,054 A | 1/1990 | Bricker et al. |
| 4,907,586 A | 3/1990 | Bille et al. |
| 4,918,751 A | 4/1990 | Pessot et al. |
| 4,929,065 A | 5/1990 | Hagerty et al. |
| 5,035,918 A | 7/1991 | Vyas |
| 5,040,182 A | 8/1991 | Spinelli et al. |
| 5,104,210 A | 4/1992 | Tokas |
| 5,108,857 A | 4/1992 | Kitayama et al. |
| 5,112,722 A | 5/1992 | Tsujino et al. |
| 5,114,834 A | 5/1992 | Nachshon |
| 5,265,107 A | 11/1993 | Delfyett, Jr. |
| 5,400,350 A | 3/1995 | Galvanauskas |
| 5,434,875 A | 7/1995 | Rieger et al. |
| 5,436,925 A | 7/1995 | Lin et al. |
| 5,553,093 A | 9/1996 | Ramaswamy et al. |
| 5,574,597 A | 11/1996 | Kataoka et al. |
| 5,586,138 A | 12/1996 | Yokoyama |
| 5,656,186 A | 8/1997 | Mourou et al. |
| 5,676,866 A | 10/1997 | In Den Baumen et al. |
| 5,684,642 A | 11/1997 | Zumoto et al. |
| 5,696,782 A | 12/1997 | Harter et al. |
| 5,736,709 A | 4/1998 | Neiheisel |
| 5,776,220 A | 7/1998 | Allaire et al. |
| 6,016,223 A | 1/2000 | Suzuki et al. |
| 6,016,324 A | 1/2000 | Rieger et al. |
| 6,033,583 A | 3/2000 | Musket et al. |
| 6,038,055 A | 3/2000 | Hänsch et al. |
| 6,055,829 A | 5/2000 | Witzmann et al. |
| 6,078,599 A | 6/2000 | Everage et al. |
| 6,156,030 A | 12/2000 | Neev |
| 6,160,835 A | 12/2000 | Kwon |
| 6,186,384 B1 | 2/2001 | Sawada |
| 6,210,401 B1 | 4/2001 | Lai |
| 6,256,328 B1 | 7/2001 | Delfyett et al. |
| 6,259,151 B1 | 7/2001 | Morrison |
| 6,259,512 B1 | 7/2001 | Mizouchi |
| 6,272,156 B1 | 8/2001 | Reed et al. |
| 6,301,932 B1 | 10/2001 | Allen et al. |
| 6,322,958 B1 | 11/2001 | Hayashi |
| 6,339,208 B1 | 1/2002 | Rockstroh et al. |
| 6,373,565 B1 | 4/2002 | Kafka et al. |
| 6,381,391 B1 | 4/2002 | Islam et al. |
| 6,396,856 B1 | 5/2002 | Sucha et al. |
| 6,407,360 B1 | 6/2002 | Choo et al. |
| 6,438,996 B1 | 8/2002 | Cuvelier |
| 6,445,491 B2 | 9/2002 | Sucha et al. |
| 6,449,301 B1 | 9/2002 | Wu et al. |
| 6,484,052 B1 | 11/2002 | Visuri et al. |
| 6,489,589 B1 | 12/2002 | Alexander |
| 6,501,578 B1 | 12/2002 | Bernstein et al. |
| 6,552,301 B2 | 4/2003 | Herman et al. |
| 6,573,026 B1 | 6/2003 | Aitken et al. |
| 6,592,703 B1 | 7/2003 | Habeck et al. |
| 6,635,849 B1 | 10/2003 | Okawa et al. |
| 6,635,850 B2 | 10/2003 | Amako et al. |
| 6,720,519 B2 | 4/2004 | Liu et al. |
| 6,729,161 B1 | 5/2004 | Miura et al. |
| 6,744,009 B1 | 6/2004 | Xuan et al. |
| 6,787,732 B1 | 9/2004 | Xuan et al. |
| 6,800,237 B1 | 10/2004 | Yamamoto et al. |
| 6,800,831 B1 | 10/2004 | Hoetzel |
| 6,958,094 B2 | 10/2005 | Ohmi et al. |
| 6,992,026 B2 | 1/2006 | Fukuyo et al. |
| 7,009,138 B2 | 3/2006 | Amako et al. |
| 7,353,829 B1 | 4/2008 | Wachter et al. |
| 7,402,773 B2 | 7/2008 | Nomaru |
| 7,511,886 B2 | 3/2009 | Schultz et al. |
| 7,535,634 B1 | 5/2009 | Savchenkov et al. |
| 7,633,033 B2 | 12/2009 | Thomas et al. |
| 7,642,483 B2 | 1/2010 | You et al. |
| 7,649,153 B2 | 1/2010 | Haight et al. |
| 7,726,532 B2 | 6/2010 | Gonoe |
| 8,104,385 B2 | 1/2012 | Hayashi et al. |
| 8,118,971 B2 | 2/2012 | Hori et al. |
| 8,132,427 B2 | 3/2012 | Brown et al. |
| 8,168,514 B2 | 5/2012 | Garner et al. |
| 8,245,539 B2 | 8/2012 | Lu et al. |
| 8,245,540 B2 | 8/2012 | Abramov et al. |
| 8,269,138 B2 | 9/2012 | Garner et al. |
| 8,283,595 B2 | 10/2012 | Fukuyo et al. |
| 8,292,141 B2 | 10/2012 | Cox et al. |
| 8,296,066 B2 | 10/2012 | Zhao et al. |
| 8,327,666 B2 | 12/2012 | Harvey et al. |
| 8,341,976 B2 | 1/2013 | Dejneka et al. |
| 8,347,651 B2 | 1/2013 | Abramov et al. |
| 8,358,888 B2 | 1/2013 | Ramachandran |
| 8,444,906 B2 | 5/2013 | Lee et al. |
| 8,448,471 B2 | 5/2013 | Kumatani et al. |
| 8,518,280 B2 | 8/2013 | Hsu et al. |
| 8,549,881 B2 | 10/2013 | Brown et al. |
| 8,584,354 B2 | 11/2013 | Cornejo et al. |
| 8,584,490 B2 | 11/2013 | Garner et al. |
| 8,592,716 B2 | 11/2013 | Abramov et al. |
| 8,604,380 B2 | 12/2013 | Howerton et al. |
| 8,607,590 B2 | 12/2013 | Glaesemann et al. |
| 8,616,024 B2 | 12/2013 | Cornejo et al. |
| 8,635,887 B2 | 1/2014 | Black et al. |
| 8,680,489 B2 | 3/2014 | Martinez et al. |
| 8,685,838 B2 | 4/2014 | Fukuyo et al. |
| 8,697,228 B2 | 4/2014 | Carre et al. |
| 8,720,228 B2 | 5/2014 | Li |
| 8,826,696 B2 | 9/2014 | Brown et al. |
| 8,852,698 B2 | 10/2014 | Fukumitsu |
| 8,887,529 B2 | 11/2014 | Lu et al. |
| 8,916,798 B2 | 12/2014 | Plüss |
| 8,943,855 B2 | 2/2015 | Gomez et al. |
| 8,971,053 B2 | 3/2015 | Kariya et al. |
| 9,138,913 B2 | 9/2015 | Arai et al. |
| 9,227,868 B2 | 1/2016 | Matsumoto et al. |
| 9,290,407 B2 | 3/2016 | Barefoot et al. |
| 9,296,066 B2 | 3/2016 | Hosseini et al. |
| 9,324,791 B2 | 4/2016 | Tamemoto |
| 9,327,381 B2 | 5/2016 | Lee et al. |
| 9,446,590 B2 | 9/2016 | Chen et al. |
| 9,481,598 B2 | 11/2016 | Bergh et al. |
| 2002/0046997 A1 | 4/2002 | Nam et al. |
| 2002/0082466 A1 | 6/2002 | Han |
| 2002/0097486 A1 | 7/2002 | Yamaguchi et al. |
| 2002/0110639 A1 | 8/2002 | Bruns |
| 2003/0006221 A1 | 1/2003 | Hong et al. |
| 2003/0007773 A1 | 1/2003 | Kondo et al. |
| 2005/0024743 A1 | 2/2005 | Camy-Peyret |
| 2005/0098548 A1 | 5/2005 | Kobayashi et al. |
| 2005/0115938 A1 | 6/2005 | Sawaki et al. |
| 2005/0274702 A1 | 12/2005 | Deshi |
| 2005/0277270 A1 | 12/2005 | Yoshikawa et al. |
| 2006/0011593 A1 | 1/2006 | Fukuyo |
| 2006/0028728 A1 | 2/2006 | Li |
| 2006/0109874 A1 | 5/2006 | Shiozaki et al. |
| 2006/0127679 A1 | 6/2006 | Gulati et al. |
| 2006/0227440 A1 | 10/2006 | Gluckstad |
| 2006/0266744 A1 | 11/2006 | Nomaru |
| 2006/0289410 A1 | 12/2006 | Morita et al. |
| 2007/0091977 A1 | 4/2007 | Sohn et al. |
| 2007/0111390 A1 | 5/2007 | Komura et al. |
| 2007/0111480 A1 | 5/2007 | Maruyama et al. |
| 2007/0119831 A1 | 5/2007 | Kandt |
| 2007/0132977 A1 | 6/2007 | Komatsuda |
| 2007/0138151 A1 | 6/2007 | Tanaka et al. |
| 2007/0177116 A1 | 8/2007 | Amako |
| 2007/0202619 A1 | 8/2007 | Tamura et al. |
| 2007/0298529 A1 | 12/2007 | Maeda et al. |
| 2008/0000884 A1 | 1/2008 | Sugiura et al. |
| 2008/0079940 A1 | 4/2008 | Sezerman et al. |
| 2008/0099444 A1 | 5/2008 | Misawa et al. |
| 2009/0013724 A1 | 1/2009 | Koyo et al. |
| 2009/0123766 A1* | 5/2009 | Peck ............ B32B 15/08 428/457 |

(56) References Cited

U.S. PATENT DOCUMENTS

| | | |
|---|---|---|
| 2009/0176034 A1 | 7/2009 | Ruuttu et al. |
| 2009/0183764 A1 | 7/2009 | Meyer |
| 2009/0242528 A1 | 10/2009 | Howerton et al. |
| 2009/0250446 A1 | 10/2009 | Sakamoto |
| 2009/0294419 A1 | 12/2009 | Abramov et al. |
| 2009/0294422 A1 | 12/2009 | Lubatschowski et al. |
| 2009/0324899 A1 | 12/2009 | Feinstein et al. |
| 2010/0025387 A1 | 2/2010 | Arai et al. |
| 2010/0029460 A1 | 2/2010 | Shojiya et al. |
| 2010/0032087 A1 | 2/2010 | Takahashi et al. |
| 2010/0086741 A1 | 4/2010 | Bovatsek et al. |
| 2010/0089631 A1 | 4/2010 | Sakaguchi et al. |
| 2010/0089882 A1 | 4/2010 | Tamura |
| 2010/0102042 A1 | 4/2010 | Garner et al. |
| 2010/0129603 A1 | 5/2010 | Blick et al. |
| 2010/0147813 A1 | 6/2010 | Lei et al. |
| 2010/0252540 A1 | 10/2010 | Lei et al. |
| 2010/0252959 A1 | 10/2010 | Lei et al. |
| 2010/0276505 A1 | 11/2010 | Smith |
| 2010/0279067 A1 | 11/2010 | Sabia et al. |
| 2010/0287991 A1 | 11/2010 | Brown et al. |
| 2010/0326138 A1 | 12/2010 | Kumatani et al. |
| 2011/0049764 A1 | 3/2011 | Lee et al. |
| 2011/0049765 A1 | 3/2011 | Li et al. |
| 2011/0088324 A1 | 4/2011 | Wessel |
| 2011/0100401 A1 | 5/2011 | Fiorentini |
| 2011/0132881 A1 | 6/2011 | Liu |
| 2011/0139760 A1 | 6/2011 | Shah et al. |
| 2011/0183116 A1 | 7/2011 | Hung et al. |
| 2011/0210105 A1 | 9/2011 | Romashko et al. |
| 2011/0240611 A1 | 10/2011 | Sandström et al. |
| 2011/0277507 A1 | 11/2011 | Lu et al. |
| 2011/0318555 A1 | 12/2011 | Bookbinder et al. |
| 2012/0017642 A1 | 1/2012 | Teranishi et al. |
| 2012/0047951 A1 | 3/2012 | Dannoux et al. |
| 2012/0048604 A1 | 3/2012 | Cornejo et al. |
| 2012/0061440 A1 | 3/2012 | Roell |
| 2012/0064306 A1 | 3/2012 | Kang et al. |
| 2012/0067858 A1 | 3/2012 | Kangastupa et al. |
| 2012/0103018 A1 | 5/2012 | Lu et al. |
| 2012/0131962 A1 | 5/2012 | Mitsugi et al. |
| 2012/0135195 A1 | 5/2012 | Glaesemann et al. |
| 2012/0135607 A1 | 5/2012 | Shimoi et al. |
| 2012/0135608 A1 | 5/2012 | Shimoi et al. |
| 2012/0145331 A1 | 6/2012 | Gomez et al. |
| 2012/0196071 A1 | 8/2012 | Cornejo et al. |
| 2012/0234049 A1 | 9/2012 | Bolton |
| 2012/0234807 A1 | 9/2012 | Sercel et al. |
| 2012/0255935 A1 | 10/2012 | Kakui et al. |
| 2012/0299219 A1 | 11/2012 | Shimoi et al. |
| 2012/0302139 A1 | 11/2012 | Darcangelo et al. |
| 2013/0019637 A1 | 1/2013 | Sol et al. |
| 2013/0034688 A1 | 2/2013 | Koike et al. |
| 2013/0044371 A1 | 2/2013 | Rupp et al. |
| 2013/0056450 A1 | 3/2013 | Lissotschenko et al. |
| 2013/0061636 A1 | 3/2013 | Imai et al. |
| 2013/0068736 A1 | 3/2013 | Mielke et al. |
| 2013/0075480 A1 | 3/2013 | Yokogi et al. |
| 2013/0091897 A1 | 4/2013 | Fugii et al. |
| 2013/0122264 A1 | 5/2013 | Fujii et al. |
| 2013/0126573 A1 | 5/2013 | Hosseini et al. |
| 2013/0129947 A1 | 5/2013 | Harvey et al. |
| 2013/0133367 A1 | 5/2013 | Abramov et al. |
| 2013/0143416 A1 | 6/2013 | Norval |
| 2013/0149434 A1 | 6/2013 | Oh et al. |
| 2013/0149494 A1 | 6/2013 | Koike et al. |
| 2013/0167590 A1 | 7/2013 | Teranishi et al. |
| 2013/0174607 A1 | 7/2013 | Wootton et al. |
| 2013/0174610 A1 | 7/2013 | Teranishi et al. |
| 2013/0180285 A1 | 7/2013 | Kariya |
| 2013/0189806 A1 | 7/2013 | Hoshino |
| 2013/0192305 A1 | 8/2013 | Black et al. |
| 2013/0209731 A1 | 8/2013 | Nattermann et al. |
| 2013/0220982 A1 | 8/2013 | Thomas et al. |
| 2013/0221053 A1 | 8/2013 | Zhang |
| 2013/0224439 A1 | 8/2013 | Zhang et al. |
| 2013/0228918 A1 | 9/2013 | Chen et al. |
| 2013/0247615 A1 | 9/2013 | Boek et al. |
| 2013/0266757 A1 | 10/2013 | Giron et al. |
| 2013/0270240 A1 | 10/2013 | Kondo |
| 2013/0280495 A1 | 10/2013 | Matsumoto |
| 2013/0288010 A1 | 10/2013 | Akarapu et al. |
| 2013/0291598 A1 | 11/2013 | Saito et al. |
| 2013/0312460 A1 | 11/2013 | Kunishi et al. |
| 2013/0323469 A1 | 12/2013 | Abramov et al. |
| 2013/0334185 A1 | 12/2013 | Nomaru |
| 2013/0340480 A1 | 12/2013 | Nattermann et al. |
| 2014/0027951 A1 | 1/2014 | Srinivas et al. |
| 2014/0034730 A1 | 2/2014 | Lee |
| 2014/0042202 A1 | 2/2014 | Lee |
| 2014/0047957 A1 | 2/2014 | Wu |
| 2014/0102146 A1 | 4/2014 | Saito et al. |
| 2014/0110040 A1 | 4/2014 | Cok |
| 2014/0113797 A1 | 4/2014 | Yamada et al. |
| 2014/0133119 A1 | 5/2014 | Kariya et al. |
| 2014/0141217 A1 | 5/2014 | Gulati et al. |
| 2014/0147623 A1 | 5/2014 | Shorey et al. |
| 2014/0147624 A1 | 5/2014 | Streltsov et al. |
| 2014/0165652 A1 | 6/2014 | Saito |
| 2014/0174131 A1 | 6/2014 | Saito et al. |
| 2014/0199519 A1 | 7/2014 | Schillinger et al. |
| 2014/0216108 A1 | 8/2014 | Weigel et al. |
| 2014/0290310 A1 | 10/2014 | Green |
| 2014/0320947 A1 | 10/2014 | Egerton et al. |
| 2014/0333929 A1 | 11/2014 | Sung et al. |
| 2014/0361463 A1 | 12/2014 | DeSimone et al. |
| 2015/0034612 A1 | 2/2015 | Hosseini et al. |
| 2015/0038313 A1 | 2/2015 | Hosseini |
| 2015/0075221 A1 | 3/2015 | Kawaguchi et al. |
| 2015/0075222 A1 | 3/2015 | Mader |
| 2015/0110442 A1 | 4/2015 | Zimmel et al. |
| 2015/0118522 A1 | 4/2015 | Hosseini |
| 2015/0136743 A1 | 5/2015 | Hosseini |
| 2015/0140241 A1 | 5/2015 | Hosseini |
| 2015/0140735 A1 | 5/2015 | Hosseini |
| 2015/0151380 A1 | 6/2015 | Hosseini |
| 2015/0158120 A1 | 6/2015 | Courvoisier et al. |
| 2015/0165548 A1 | 6/2015 | Marjanovic et al. |
| 2015/0165560 A1 | 6/2015 | Hackert et al. |
| 2015/0165562 A1 | 6/2015 | Marjanovic et al. |
| 2015/0165563 A1 | 6/2015 | Manley et al. |
| 2015/0166391 A1 | 6/2015 | Marjanovic et al. |
| 2015/0166393 A1 | 6/2015 | Marjanovic et al. |
| 2015/0166394 A1 | 6/2015 | Marjanovic et al. |
| 2015/0166395 A1 | 6/2015 | Marjanovic et al. |
| 2015/0166396 A1 | 6/2015 | Marjanovic et al. |
| 2015/0166397 A1 | 6/2015 | Marjanovic et al. |
| 2015/0183679 A1 | 7/2015 | Saito |
| 2015/0232369 A1 | 8/2015 | Marjanovic et al. |
| 2015/0299018 A1 | 10/2015 | Bhuyan et al. |
| 2015/0360991 A1 | 12/2015 | Grundmueller et al. |
| 2015/0367442 A1 | 12/2015 | Bovatsek et al. |
| 2016/0008927 A1 | 1/2016 | Grundmueller et al. |
| 2016/0009066 A1 | 1/2016 | Nieber et al. |
| 2016/0023922 A1 | 1/2016 | Addiego et al. |
| 2016/0031745 A1 | 2/2016 | Ortner et al. |
| 2016/0060156 A1 | 3/2016 | Krueger et al. |
| 2016/0279895 A1 | 9/2016 | Marjanovic et al. |
| 2016/0280580 A1 | 9/2016 | Bohme |
| 2016/0290791 A1 | 10/2016 | Buono et al. |
| 2017/0052381 A1 | 2/2017 | Huang et al. |
| 2017/0368638 A1 | 12/2017 | Tayebati et al. |

FOREIGN PATENT DOCUMENTS

| | | |
|---|---|---|
| CN | 101502914 A | 8/2009 |
| CN | 201357287 Y | 12/2009 |
| CN | 101637849 A | 2/2010 |
| CN | 201471092 U | 5/2010 |
| CN | 102672355 A | 9/2012 |
| CN | 102898014 A | 1/2013 |
| CN | 102923939 A | 2/2013 |
| CN | 103013374 A | 4/2013 |
| CN | 103143841 A | 6/2013 |

(56) References Cited

FOREIGN PATENT DOCUMENTS

| | | |
|---|---|---|
| CN | 203021443 U | 6/2013 |
| CN | 103273195 A | 9/2013 |
| CN | 103316990 A | 9/2013 |
| CN | 103359947 A | 10/2013 |
| CN | 103359948 A | 10/2013 |
| CN | 103531414 A | 1/2014 |
| CN | 103746027 A | 4/2014 |
| CN | 203509350 U | 4/2014 |
| CN | 104344202 A | 2/2015 |
| CN | 102672355 B | 5/2015 |
| DE | 2231330 A1 | 1/1974 |
| DE | 102006035555 A1 | 1/2008 |
| DE | 102012010635 A1 | 11/2013 |
| DE | 102012110971 A1 | 5/2014 |
| DE | 102013223637 A1 | 5/2015 |
| EP | 270897 A1 | 2/1992 |
| EP | 0609978 A1 | 8/1994 |
| EP | 656241 B1 | 12/1998 |
| EP | 938946 A1 | 9/1999 |
| EP | 949541 A2 | 10/1999 |
| EP | 1159104 B1 | 8/2004 |
| EP | 1609559 A1 | 12/2005 |
| EP | 1043110 B1 | 8/2006 |
| EP | 2133170 A1 | 12/2009 |
| EP | 2202545 A1 | 6/2010 |
| EP | 2574983 A1 | 4/2013 |
| EP | 2754524 B1 | 7/2014 |
| EP | 2781296 A1 | 9/2014 |
| EP | 2783784 A2 | 10/2014 |
| EP | 2859984 A2 | 4/2015 |
| FR | 2989294 A1 | 10/2013 |
| GB | 1242172 A | 8/1971 |
| GB | 2481190 B | 1/2015 |
| JP | 1179770 A | 7/1989 |
| JP | 6318756 A | 11/1994 |
| JP | 9106243 A | 4/1997 |
| JP | 11197498 A | 7/1999 |
| JP | 11269683 A | 10/1999 |
| JP | 11330597 A | 11/1999 |
| JP | 11347758 A | 12/1999 |
| JP | 2001138083 A | 5/2001 |
| JP | 2002210730 A | 7/2002 |
| JP | 2002228818 A | 8/2002 |
| JP | 2003025085 A | 1/2003 |
| JP | 2003114400 A | 4/2003 |
| JP | 2003154517 A | 5/2003 |
| JP | 2003181668 A | 7/2003 |
| JP | 2003238178 A | 8/2003 |
| JP | 2004209675 A | 7/2004 |
| JP | 2005104819 A | 4/2005 |
| JP | 2005205440 A | 8/2005 |
| JP | 2005288503 A | 10/2005 |
| JP | 3775250 B2 | 5/2006 |
| JP | 3775410 B2 | 5/2006 |
| JP | 2006130691 A | 5/2006 |
| JP | 2006248885 A | 9/2006 |
| JP | 2007021548 A | 2/2007 |
| JP | 2007196277 A | 8/2007 |
| JP | 2007253203 A | 10/2007 |
| JP | 2009056482 A | 3/2009 |
| JP | 2009172633 A | 8/2009 |
| JP | 2010017990 A | 1/2010 |
| JP | 4592855 B2 | 12/2010 |
| JP | 2011049398 A | 3/2011 |
| JP | 4672689 B2 | 4/2011 |
| JP | 2011517299 A | 6/2011 |
| JP | 4880820 B2 | 2/2012 |
| JP | 2012024782 A | 2/2012 |
| JP | 2012031018 A | 2/2012 |
| JP | 2012159749 A | 8/2012 |
| JP | 2012187618 A | 10/2012 |
| JP | 2013007842 A | 1/2013 |
| JP | 2013031879 A | 2/2013 |
| JP | 2013043808 A | 3/2013 |
| JP | 2013075802 A | 4/2013 |
| JP | 2013091578 A | 5/2013 |
| JP | 5274085 B2 | 8/2013 |
| JP | 5300544 B2 | 9/2013 |
| JP | 2013187247 A | 9/2013 |
| JP | 2013203630 A | 10/2013 |
| JP | 2013203631 A | 10/2013 |
| JP | 2013223886 A | 10/2013 |
| KR | 2012015366 | 2/2002 |
| KR | 2009057161 | 6/2009 |
| KR | 1020621 | 3/2011 |
| KR | 1120471 B1 | 3/2012 |
| KR | 2012074508 | 7/2012 |
| KR | 2013031380 | 3/2013 |
| KR | 1269474 | 5/2013 |
| KR | 2013124646 | 11/2013 |
| KR | 1344368 | 12/2013 |
| KR | 2014022980 | 2/2014 |
| KR | 2014022981 | 2/2014 |
| KR | 2014064220 | 5/2014 |
| TW | 201139025 A | 11/2011 |
| TW | 201226345 | 7/2012 |
| WO | 1999029243 A1 | 7/1999 |
| WO | 1999063900 A1 | 12/1999 |
| WO | 2004110693 A1 | 12/2004 |
| WO | 2006073098 A1 | 7/2006 |
| WO | 2007094160 A1 | 8/2007 |
| WO | 2008049389 A1 | 5/2008 |
| WO | 2008080182 A1 | 7/2008 |
| WO | 2008128612 A1 | 10/2008 |
| WO | 2009114375 A2 | 9/2009 |
| WO | 2010035736 A1 | 4/2010 |
| WO | 2010111609 A2 | 9/2010 |
| WO | 2010129459 A2 | 11/2010 |
| WO | 2011025908 A1 | 3/2011 |
| WO | 2011056781 A1 | 5/2011 |
| WO | 2012006736 A2 | 1/2012 |
| WO | 2012075072 A2 | 6/2012 |
| WO | 2012108052 A1 | 8/2012 |
| WO | 2012166753 A1 | 12/2012 |
| WO | 2013022148 A1 | 2/2013 |
| WO | 2013043173 A1 | 3/2013 |
| WO | 2013138802 A1 | 9/2013 |
| WO | 2013150990 A1 | 10/2013 |
| WO | 2013153195 A1 | 10/2013 |
| WO | 2014028022 A1 | 2/2014 |
| WO | 2014064492 A1 | 5/2014 |
| WO | 2014079478 A1 | 5/2014 |
| WO | 2014079570 A1 | 5/2014 |
| WO | 2014085663 A1 | 6/2014 |
| WO | 2014111385 A1 | 7/2014 |
| WO | 2014111794 A1 | 7/2014 |
| WO | 2014161534 A2 | 10/2014 |
| WO | 2014161535 A2 | 10/2014 |
| WO | 201577113 A1 | 5/2015 |
| WO | 2015077113 A1 | 5/2015 |
| WO | 2015095088 A1 | 6/2015 |
| WO | 2015095090 A1 | 6/2015 |
| WO | 2015095146 A1 | 6/2015 |
| WO | 2015127583 A1 | 9/2015 |
| WO | 2016005455 A1 | 1/2016 |
| WO | 2016010954 A2 | 1/2016 |
| WO | 20160154284 A1 | 9/2016 |

OTHER PUBLICATIONS

Abramov et al., "Laser separation of chemically strengthened glass"; Physics Procedia 5 (2010) 285-290, Elsevier.; doi: 10.1016/j.phpro.2010.08.054.

Arimoto et al., "Imaging properties of axicon in a scanning optical system"; Applied Optics, Nov. 1, 1992, vol. 31, No. 31, pp. 6653-6657.

"TruMicro 5000" Product Manual, Trumpf Laser GmbH + Co. KG, pp. 1-4, Aug. 2011.

Bhuyan et al., "High aspect ratio nanochannel machining using single shot femtosecond Bessel beams"; Applied Physics Letters 97, 081102 (2010); doi: 10.1063/1.3479419.

(56) References Cited

OTHER PUBLICATIONS

Bhuyan et al., "High aspect ratio taper-free microchannel fabrication using femtosecond Bessel beams"; Optics Express (2010) vol. 18, No. 2, pp. 566-574.
Cubeddu et al., "A compact time-resolved reflectance system for dual-wavelength multichannel assessment of tissue absorption and scattering"; Part of the SPIE Conference on Optical Tomography and Spectroscopy of Tissue III, San Jose, CA (Jan. 1999), SPIE vol. 3597, 0277-786X/99, pp. 450-455.
Cubeddu et al., "Compact tissue oximeter based on dual-wavelength multichannel time-resolved reflectance"; Applied Optics, vol. 38, No. 16, Jun. 1, 1999, pp. 3670-3680.
Ding et al., "High-resolution optical coherence tomography over a large depth range with an axicon lens"; Optic Letters, vol. 27, No. 4, pp. 243-245, Feb. 15, 2002, Optical Society of America.
"EagleEtch" Product Brochure, EuropeTec USA Inc., pp. 1-8, Aug. 1, 2014.
Girkin et al., "Macroscopic multiphoton biomedical imaging using semiconductor saturable Bragg reflector modelocked Lasers"; Part of the SPIE Conference on Commercial and Biomedical Applications of Ultrafast Lasers, San Jose, CA (Jan. 1999), SPIE vol. 3616, 0277-786X/99, pp. 92-98.
Glezer et al., "Ultrafast-laser driven micro-explosions in transparent materials"; Applied Physics Letters, vol. 71 (1997), pp. 882-884.
Golub, I., "Fresnel axicon"; Optic Letters, vol. 31, No. 12, Jun. 15, 2006, Optical Society of America, pp. 1890-1892.
Herman et al., "Laser micromachining of 'transparent' fused silica with 1-ps pulses and pulse trains"; Part of the SPIE Conference on Commercial and Biomedical Applications of Ultrafast Lasers, San Jose, CA (Jan. 1999), SPIE vol. 3616, 0277-786X/99, pp. 148-155.
Kosareva et al., "Formation of extended plasma channels in a condensed medium upon axicon focusing of a femtosecond laser pulse"; Quantum Electronics 35 (11) 1013-1014 (2005), Kvantovaya Elektronika and Turpion Ltd.; doi: 10.1070/QE2005v035n11ABEH013031.
Krüger et al., "Femtosecond-pulse visible laser processing of transparent materials"; Applied Surface Science 96-98 (1996) 430-438.
Krüger et al., "Laser micromachining of barium aluminium borosilicate glass with pluse durations between 20 fs and 3 ps"; Applied Surface Science 127-129 (1998) 892-898.
Krüger et al., "Structuring of dielectric and metallic materials with ultrashort laser pulses between 20 fs and 3 ps"; SPIE vol. 2991, 0277-786X/97, pp. 40-47.
Lapczyna et al., "Ultra high repetition rate (133 MHz) laser ablation of aluminum with 1.2-ps pulses"; Applied Physics A 69 [Suppl.], S883-S886, Springer-Verlag (1999); doi: 10.1007/s003399900300.
Perry et al., "Ultrashort-pulse laser machining"; UCRL-JC-132159 Rev 1., Jan. 22, 1999, pp. 1-24.
Perry et al., "Ultrashort-pulse laser machining"; UCRL-ID-132159, Sep. 1998, pp. 1-38.
Perry et al., "Ultrashort-pulse laser machining of dielectric materials"; Journal of Applied Physics, vol. 85, No. 9, May 1, 1999, American Institute of Physics, pp. 6803-6810.
"Pharos High-power femtosecond laser system" product brochure; Light Conversion, Vilnius, LT; Apr. 18, 2011, pp. 1-2.
Polynkin et al., "Extended filamentation with temporally chirped femtosecond Bessel-Gauss beams in air"; Optics Express, vol. 17, No. 2, Jan. 19, 2009, OSA, pp. 575-584.
Serafetinides et al., "Ultra-short pulsed laser ablation of polymers"; Applied Surface Science 180 (2001) 42-56.
Sundaram et al., "Inducing and probing non-thermal transitions in semiconductors using femtosecond laser pulses"; Nature Miracles, vol. 1, Dec. 2002, Nature Publishing Group (2002), pp. 217-224.
Vanagas et al., "Glass cutting by femtosecond pulsed irradiation"; J. Micro/Nanolith. MEMS MOEMS. 3(2), 358-363 (Apr. 1, 2004); doi: 10.1117/1.1668274.
Varel et al., "Micromachining of quartz with ultrashort laser pulses"; Applied Physics A 65, 367-373, Springer-Verlag (1997).

Yoshino et al., "Micromachining with a high repetition rate femtosecond fiber laser"; JLMN—Journal of Laser Micro/Nanoengineering vol. 3, No. 3 (2008), pp. 157-162.
Zeng et al. "Characteristic analysis of a refractive axicon system for optical trepanning"; Optical Engineering 45(9), 094302 (Sep. 2006), pp. 094302-1-094302-10.
Zhang et al., "Design of diffractive-phase axicon illuminated by a Gaussian-profile beam"; Acta Physica Sinica (overseas edition), vol. 5, No. 5 (May 1996) Chin. Phys. Soc., 1004-423X/96/05050354-11, pp. 354-364.
Abakians, H. et al.; Evaporative Cutting of a Semitransparent Body With a Moving CW Laser; Journal of Heat Transfer; Nov. 1988; pp. 924-930; vol. 110; ASME.
Ahmed, F. et al.; Display glass cutting by femtosecond laser induced single shot periodic void array; Applied Physics A Material Science & Processing; Jun. 3, 2008; pp. 189-192; vol. 93; Springer-Verlag.
Bagchi, S. et al.; Fast ion beams from intense, femtosecond laser irradiated nanostructured surfaces; Applied Physics B Lasers and Optics; Jun. 27, 2007; pp. 167-173; vol. 88; Springer-Verlag.
Bhuyan, M.K. et al.; Femtosecond non-diffracting Bessel beams and controlled nanoscale ablation; ResearchGate Conference Paper; Sep. 2011; pp. 1-4.
Bhuyan, M.K. et al.; Laser micro- and nanostructuring using femtosecond Bessel beams; The European Physical Journal Special Topics; Dec. 7, 2011; pp. 101-110; vol. 1999; EDP Sciences, Springer-Verlag.
Bhuyan, M.K. et al.; Single-shot high aspect ratio bulk nanostructuring of fused silica using chirp-controlled ultrafast laser Bessel beams; Applied Physics Letters; Jan. 14, 2014; pp. 02110-1-021107-4; vol. 104; AIP Publishing LLC.
Bhuyan, M.K. et al.; Ultrafast Bessel beams for high aspect ratio taper free micromachining of glass; Nonlinear Optics and Applications IV; 2010; pp. 77281V-1-77281V-8; vol. 7728; SPIE.
Case Design Guidelines for Apple Devices; Sep. 13, 2013; pp. 1-58; Apple Inc.
Chiao, R. Y. et al.; Self-Trapping of Optical Beams; Physical Review Letters; Oct. 12, 1964; pp. 479-482; vol. 13, No. 15.
Corning EAGLE AMLCD Glass Substrates Material Information; Apr. 2005; pp. MIE 201-1-MIE 201-3; Corning Incorporated.
Corning 1737 AMLCD Glass Substrates Material Information; Aug. 2002; pp. MIE 101-1-MIE 101-3; Corning Incorporated.
Couairon, A. et al.; Femtosecond filamentation in transparent media; ScienceDirect Physical Reports; Feb. 6, 2007; pp. 47-189; vol. 441; Elsevier B.V.
Courvoisier, F. et al.; Applications of femtosecond Bessel beams to laser ablation; Applied Physics A Materials Science & Processing; Sep. 6, 2012; pp. 29-34; vol. 112; Springer-Verlag.
Courvoisier, F. et al.; Surface nanoprocessing with nondiffracting femtosecond Bessel beams; Optics Letters; Oct. 15, 2009; pp. 3163-3165; vol. 34, No. 20; Optical Society of America.
Dong, M. et al.; On-axis irradiance distribution of axicons illuminated by spherical wave; ScienceDirect Optics & Laser Technology; Sep. 2007; pp. 1258-1261; vol. 39; Elsevier Ltd.
Duocastella, M. et al.; Bessel and annular beams for materials processing; Laser & Photonics Reviews; 2012; pp. 607-621; vol. 6, No. 5.
Durnin, J.; Exact solutions for nondiffracting beams. I. The scalar theory; J. Opt. Soc. Am. A; Apr. 1987; pp. 651-654; vol. 4, No. 4; Optical Society of America.
Eaton, S. et al.; Heat accumulation effects in femtosecond laser-written waveguides with variable repetition rate; Optics Express; Jun. 13, 2005; pp. 4708-4716; vol. 13, No. 12; Optical Society of America.
Gattass, R. et al.; Micromachining of bulk glass with bursts of femtosecond laser pulses at variable repetition rates; Optics Express; Jun. 12, 2006; pp. 5279-5284; vol. 14, No. 12; Optical Society of America.
Gori, F. et al.; Analytical derivation of the optimum triplicator; Optics Communications; Dec. 1, 1998; pp. 13-16; vol. 157; Elsevier B.V.
Honda, M. et al.; A Novel Polymer Film that Controls Light Transmission; Progress in Pacific Polymer Science 3; 1994; pp. 159-169; Springer-Verlag Berlin Heidelberg.

(56) References Cited

OTHER PUBLICATIONS

Hu, Z. et al.; 5-Axis Laser Cutting Interference Detection and Correction Based on STL Model; Chinese Journal of Lasers; Dec. 2009; pp. 3313-3317; vol. 36, No. 12.

Huang, Z. et al.; Laser etching of glass substrates by 1064 nm laser irradiation; Applied Physics A Materials Science & Processing; Jun. 6, 2008; pp. 159-163; vol. 93; Springer-Verlag.

Juodkazis, S. et al.; Laser-Induced Microexplosion Confined in the Bulk of a Sapphire Crystal: Evidence of Multimegabar Pressures; Physical Review Letters; Apr. 28, 2006; pp. 166101-1-166101-4; vol. 96; The American Physical Society.

Karlsson, S. et al.; The Technology of Chemical Glass Strengthening—A Review; Glass Technology—European Journal of Glass Science and Technology Part A; Apr. 2010; pp. 41-54; vol. 51, No. 2.

Levy, U. et al.; Design, fabrication, and characterization of circular Dammann gratings based on grayscale lithography; Optics Letters; Mar. 15, 2010; pp. 880-882; vol. 35, No. 6; Optical Society of America.

Liu, X. et al.; Laser Ablation and Micromachining with Ultrashort Laser Pulses; IEEE Journal of Quantum Electronics; Oct. 1997; p. 1706-1716; vol. 33, No. 10; IEEE.

Maeda, K. et al.; Optical performance of angle dependent light control glass; Optical Materials Technology for Energy Efficiency and Solar Energy Conversion X; 1991; pp. 138-148; vol. 1536; SPIE.

Mbise, G. et al.; Angular selective window coatings; theory and experiments; J. Phys. D: Appl. Phys.; 1997; pp. 2103-2122; vol. 30; IOP Publishing Ltd.

McGloin, D. et al.; Bessel beams: diffraction in a new light; Contemporary Physics; Jan.-Feb. 2005; pp. 15-28; vol. 46; Taylor & Francis Ltd.

Merola, F. et al.; Characterization of Bessel beams generated by polymeric microaxicons; Measurement Science and Technology; May 15, 2012; pp. 1-10; vol. 23; IOP Publishing Ltd.

Mirkhalaf, M. et al.; Overcoming the brittleness of glass through bio-inspiration and micro-architecture; Nature Communications; Jan. 28, 2014; pp. 1-9; Macmillan Publishers Limited.

Romero, L. et al.; Theory of optimal beam splitting by phase gratings. II. Square and hexagonal gratings; J. Opt. Soc. Am. A; Aug. 2007; pp. 2296-2312; vol. 24, No. 8; Optical Society of America.

Salleo, A. et al.; Machining of transparent materials using an IR and UV nanosecond pulsed laser; Applied Physics A Materials Science & Processing; Sep. 20, 2000; pp. 601-608; vol. 71; Springer-Verlag.

Serafetinides, A. et al.; Polymer Ablation by Ultra-Short Pulsed Lasers; Proceedings of SPIE; 2000; pp. 409-415.

Shah, L. et al.; Micromachining with a High Repetition Rate Femtosecond Fiber Laser; JLMN—Journal of Laser Micro/Nanoengineering; Nov. 2008; pp. 157-162; vol. 3, No. 3.

Shealy, D. et al.; Geometric optics-based design of laser beam shapers; Opt. Eng.; Nov. 2003; pp. 3123-3138; vol. 42, No. 11; Society of Photo-Optical Instrumentation Engineers.

Stoian, R. et al.; Spatial and temporal laser pulse design for material processing on ultrafast scales; Applied Physics A Materials Science & Processing; Jan. 1, 2014; pp. 119-127; vol. 114; Springer-Verlag Berlin Heidelberg.

Thiele, E.; Relation between Catalytic Activity and Size of Particle; Industrial and Engineering Chemistry; Jul. 1939; pp. 916-920; vol. 31, No. 7.

Toytman, I. et al.; Optical breakdown in transparent media with adjustable axial length and location; Optic Express; Nov. 22, 2010; pp. 24688-24698; vol. 18, No. 24; Optical Society of America.

Velpula, P. et al.; Ultrafast imaging of free carriers: controlled excitation with chirped ultrafast laser Bessel beams; Laser Applications in Microelectronic and Optoelectronic Manufacturing (LAMOM) XIX; Proc. of SPIE; 2014; pp. 896711-1-896711-8; vol. 8967; SPIE.

Wang, Z. et al.; Investigation on CO2 laser irradiation inducing glass strip peeling for microchannel formation; Biomicrofluidics; Mar. 12, 2012; pp. 012820-1-012820-12; vol. 6; American Institute of Physics.

Ra & RMS: Calculating Surface Roughness; Harrison Eelectropolishing; 2012.

Wu, W. et al.; Optimal Orientation of the Cutting Head for Enhancing Smoothness Movement in Three-Dimensional Laser Cutting; Chinese Journal of Lasers; Jan. 2013; pgs. 0103005-1-0103005-7, vol. 10, No. 1.

GT ASF Grown Sapphire Cover and Touch Screen Material; www.gtat.com; 2012; pp. 1-2; GTAT Corporation.

Xu, H. et al.; Optimization of 3D laser cutting head orientation based on minimum energy consumption; Int J Adv Manuf Technol; Jun. 28, 2014; pp. 1283-1291; vol. 74; Springer-Verlag London.

Yan, Y. et al.; Fiber structure to convert a Gaussian beam to higher-order optical orbital angular momentum modes; Optics Letters; Aug. 15, 2012; pp. 3294-3296; vol. 37, No. 16; Optical Society of America.

Kerr. "Filamentary tracks formed in transparent optical glass by laser beam self-focusing. II. Theoretical Analysis" Physical Review A. 4(3) 1971, pp. 1196-1218.

* cited by examiner

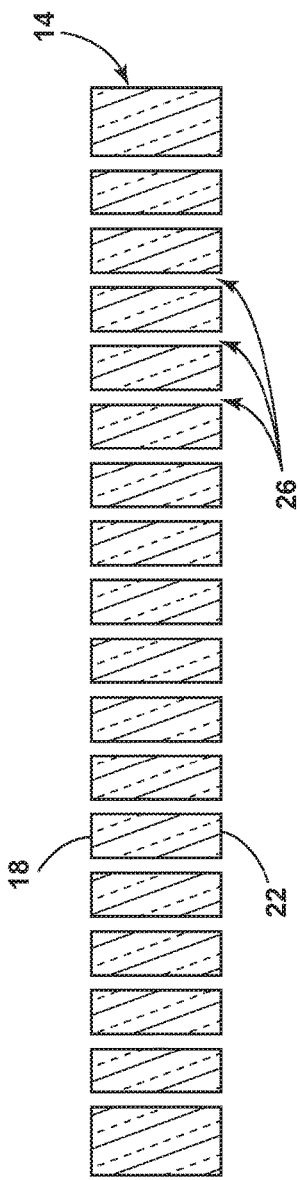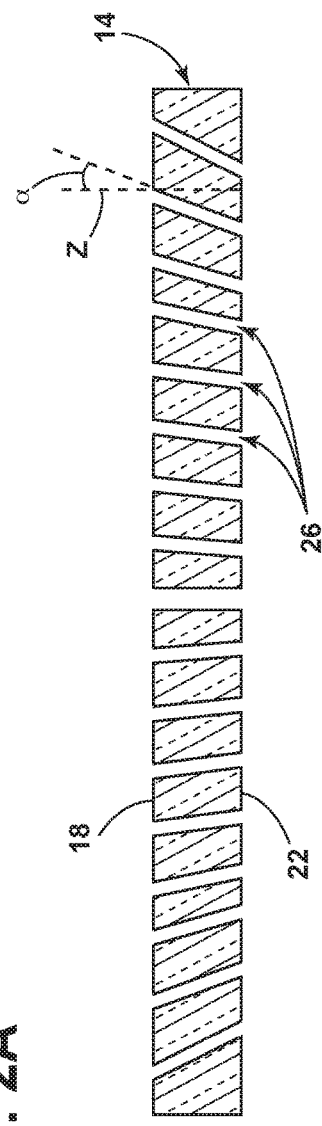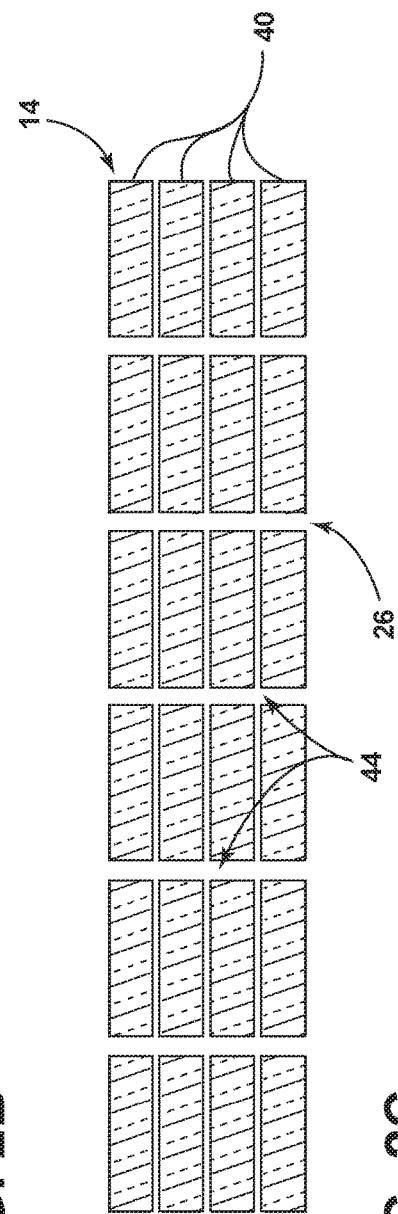
FIG. 2A
FIG. 2B
FIG. 2C

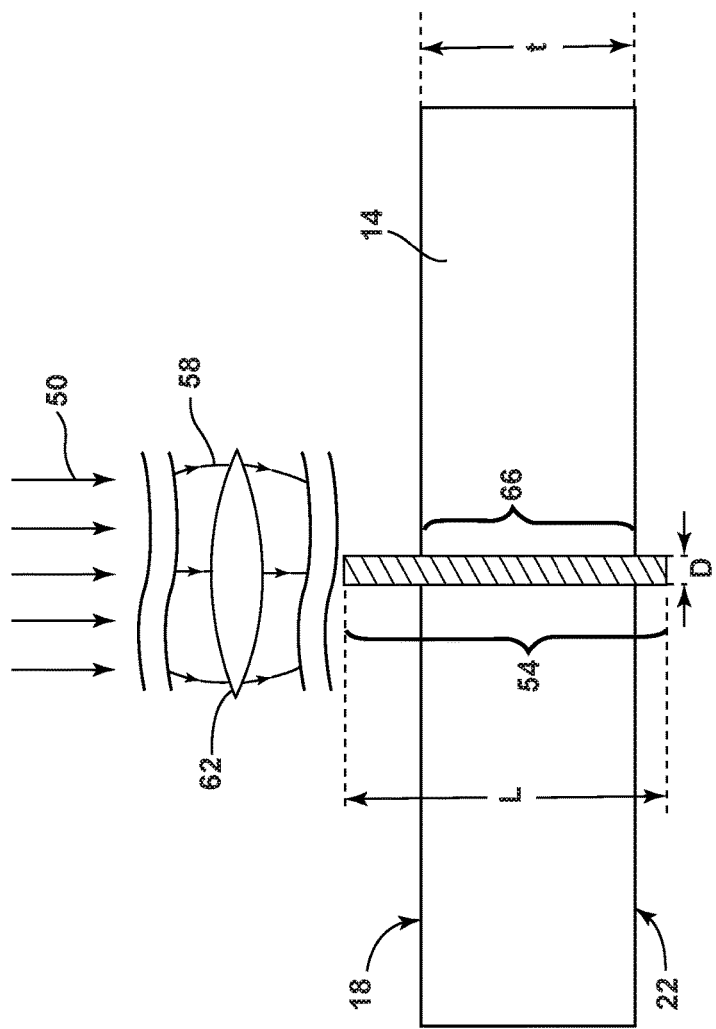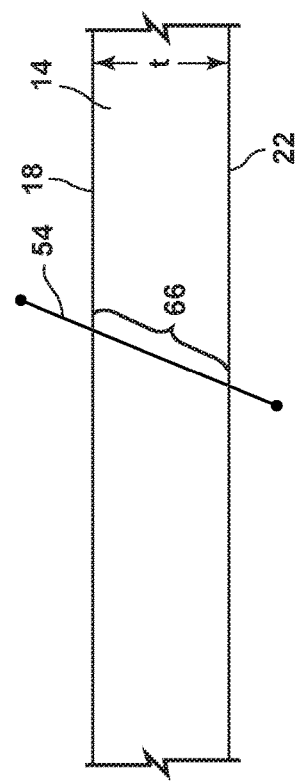
FIG. 3A
FIG. 3B

GAS PERMEABLE WINDOW AND METHOD OF FABRICATING THE SAME

This application claims the benefit of priority under 35 U.S.C. § 119 of U.S. Provisional Application Ser. No. 62/139,238 filed on Mar. 27, 2015, the content of which is relied upon and incorporated herein by reference in its entirety.

BACKGROUND

Generally, polymeric materials have a poor transmissivity to light having a wavelength in the ultraviolet region of the spectrum. Additionally, polymeric materials typically have lower stiffness values than other optically transparent materials. Further, the processing of polymeric materials such that they may be permeable to certain gases may negatively affect the transmissivity and stiffness attributes of the polymeric material. Accordingly, the creation of an article which is both stiff and transparent to ultraviolet light, but which is permeable to gas, is desired.

SUMMARY

According to one embodiment, a gas permeable glass window suitable for use with liquid interface additive manufacturing includes an optically transparent glass article greater than about 0.5 millimeters in thickness. The glass article defines a first surface and a second surface. A plurality of gas channels are disposed through the article from the first surface to the second surface. The gas channels occupy less than about 1.0% of a surface area of the article and are configured such that the article has a gas permeability between about 10 barrers and about 2000 barrers.

According to another embodiment, a method of forming a gas permeable glass window includes steps of providing an optically transparent glass article having a first surface and a second surface, focusing a pulsed laser beam into a laser beam focal line, viewed along the beam propagation direction, and forming a plurality of gas channels in the article by repeatedly directing the laser beam focal line into the optically transparent glass article at an angle of incidence to the first surface of the glass article. The laser beam focal line generates an induced absorption within the article and each induced absorption produces a gas channel along the laser beam focal line from the first surface to the second surface within the article. The number and diameter of the gas channels is determined based on a desired gas permeability through the article.

According to another embodiment, a gas permeable window includes an optically transparent article defining a first surface and a second surface. A plurality of gas channels extend from the first surface to the second surface. The gas channels are disposed at an angle between about 0° to about 15° relative to an axis orthogonal to the first and second surfaces. The angle of the channels increases with an increasing distance from a central point.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding and are incorporated in and constitute a part of this specification. The drawings illustrate one or more embodiments, and together with the description, serve to explain principles and operation of the various embodiments.

BRIEF DESCRIPTION OF THE DRAWINGS

In the drawings:

FIG. 2A is an enhanced cross sectional view along line II of FIG. 1 according to one embodiment;

FIG. 2B is an enhanced cross sectional view along line II of FIG. 1 according to another embodiment;

FIG. 2C is an enhanced cross sectional view along line II of FIG. 1 according to yet another embodiment;

FIG. 3A is a schematic illustration of an optical assembly for laser drilling;

FIG. 3B is an illustration of an alternate positioning of a laser beam focal line relative to an article;

DETAILED DESCRIPTION

Figure 1:
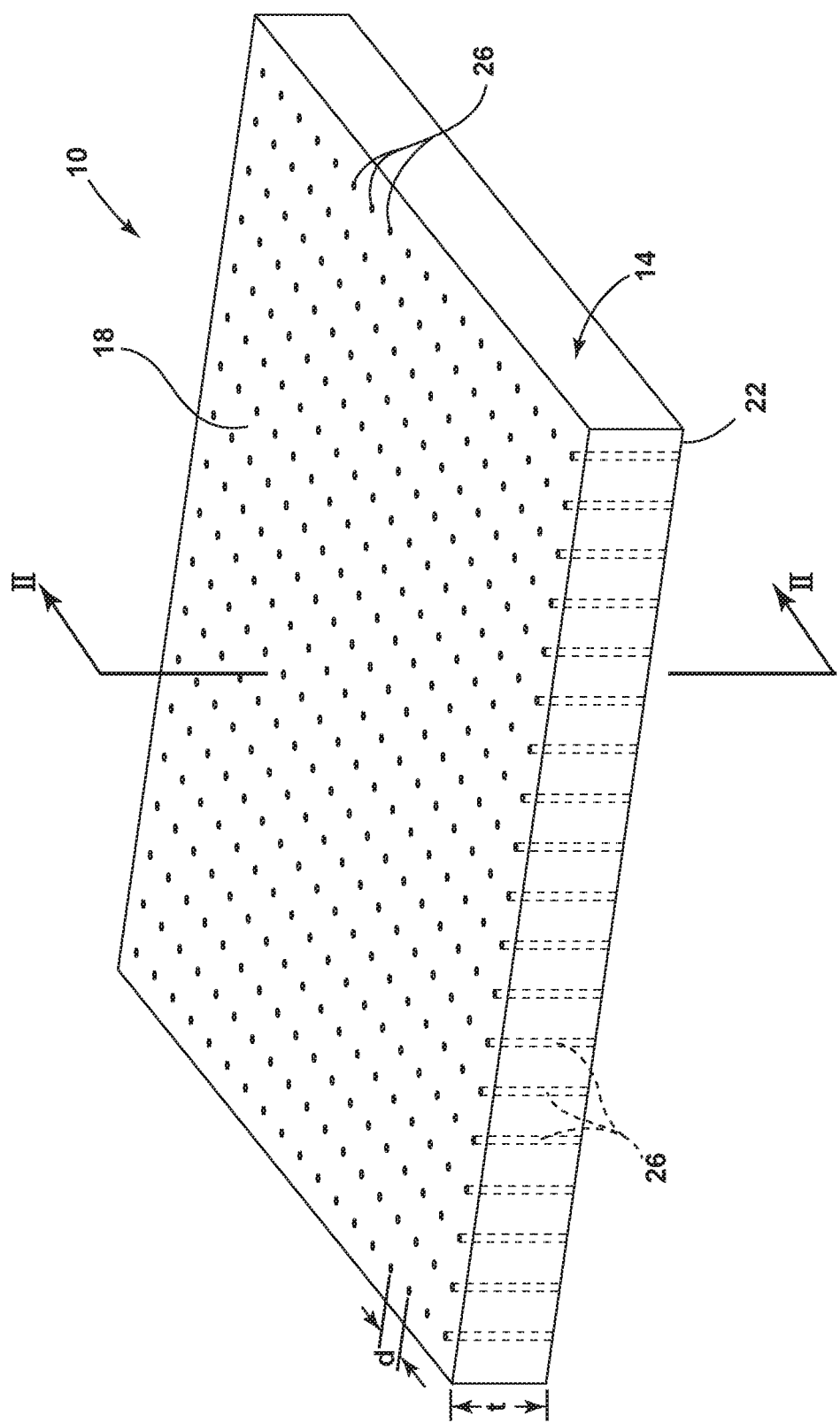
FIG. 1 is a perspective view of a gas permeable window according to one embodiment.

Reference will now be made in detail to the present preferred embodiments, examples of which are illustrated in the accompanying drawings. Whenever possible, the same reference numerals will be used throughout the drawings to refer to the same or like parts.

For purposes of description herein, the terms "upper," "lower," "right," "left," "rear," "front," "vertical," "horizontal," and derivates thereof shall relate to a gas permeable window 10 as oriented in FIG. 1, unless stated otherwise. However, it is to be understood that the gas permeable window 10 may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIGS. 1-2C, depicted is an embodiment of the gas permeable window 10. The window 10 may be suitable for use in a liquid interface additive manufacturing device as well as applications where gas pressure equalization is desirable. The window 10 includes an optically transparent article 14 defining a first surface 18 and a second surface 22. Extending through the optically transparent article 14 is a plurality of gas channels 26. The gas channels 26 extend from the first surface 18 to the second surface 22 and facilitate fluid and optical communication between spaces on different sides of the window 10. Although each gas channel 26 is depicted as extending fully through the article 14, it should be understood that some gas channels 26 may not fully extend through the article 14. The article 14 may have a thickness t which may be in the range from about 0.1 millimeters to about 15.0 millimeters, or in the range of about 0.5 millimeters to about 10.0 millimeters, or in the range of about 1 millimeter to about 3.2 millimeters, or in a range of about 0.1 millimeters to about 0.7 millimeters, or as thick as about 30 microns. The article 14 is made of a material which may include at least one of glass, glass laminates, glass composites, sapphire, glass-sapphire stack, and other materials that are substantially transparent. In glass embodiments of the article 14, high-performance glass such as Corning's Eagle X6®, or inexpensive glass such as soda-lime glass, for example, may be utilized. Additionally, in embodiments where the article 14 includes a glass, the glass article 14 may have at least one ion-exchange region present from alkali, alkali-earth, and/or transition metal doping. Further, where the article 14 includes glass, the article 14 may have been thermally tempered. In embodiments where the optically transparent article 14 includes a glass, the article 14, and therefore the window 10, may be optically transparent to light having a wavelength in the range of between about 100 nanometers and about 1,200 nanometers, or in a range of about 250 nanometers to about 1,100 nanometers.

In the depicted embodiment, the gas channels 26 are evenly spaced in a grid pattern across the first and second surfaces 18, 22 of the article 14, but may additionally or alternatively be arranged in other configurations and patterns. For example, the gas channels 26 may be randomly spaced across the article 14, in an aperiodic pattern, or in other patterns or arrangements not susceptible to easy recognition by a human eye. The density, or number of gas channels 26 per unit area, may range between about 10 per square millimeter to about 40,000 per square millimeter, or range between about 50 per square millimeter to about 20,000 per square millimeter, or range between about 100 per square millimeter to about 400 per square millimeter. Additionally, portions of the article 14 may have higher or lower densities of gas channels 26 relative to other portions. For example, the density of gas channels may vary according to a pattern, randomly, and may incorporate areas where there are no gas channels (e.g., direct center or edges of the article 14). The distance d between each of the gas channels 26 may range, depending on the gas channel 26 orientations, between about 1 micron to about 400 microns, more specifically between about 5 microns to about 250 microns, and more specifically between about 50 microns to about 100 microns.

The diameter of the gas channels 26 may be in the range of about 0.1 microns to about 250 microns, or in the range of about 0.2 microns to about 100 microns, or in the range of about 0.25 microns to about 50 microns. It should be understood that the diameter of the gas channels 26 may vary from channel to channel, or may vary as a function of the gas channel's location within the article 14. The diameter of the gas channels 26, and the thickness t of the optically transparent article 14, may be set based on a desired aspect ratio of the gas channels 26. The aspect ratio is measured as the length of the gas channels 26 (e.g., the thickness t of the article 14) to the diameter of the gas channels 26. The aspect ratio of the gas channels 26 may be in the range of about 20:1 to about 50,000:1, or may be in the range of about 10:1 to about 12,000:1, or may be in the range of about 50:1 to about 500:1. In some embodiments, each gas channel 26 has the same or a substantially similar aspect ratio across the article 14, while in other embodiments the aspect ratios of the gas channels 26 may vary (e.g., via increasing or decreasing the diameter of individual gas channels 26). For example, in some embodiments, the aspect ratio of the gas channels 26 may be assigned randomly, while in other embodiments, the aspect ratio may change or vary from channel to channel based on a larger pattern or location of the individual gas channel 26 on the article 14. In some embodiments, high aspect ratios of the gas channels 26 are desirable, as thin gas channels 26 may minimize optical distortions of light passing through the optically transparent article 14. Additionally, high aspect ratio gas channels 26 may reduce any artifacts in images created from light transmitted through the article 14. Further, the fraction of surface area of the article 14 that is occupied by the gas channels 26 may also affect the light transmittance of the gas permeable window 10. The fraction of surface area of the article 14 covered by the gas channels 26 may be less than about 2.0%, more specifically less than about 1.0%, even more specifically less than about 0.1%, and in some embodiments, less than about 0.01%.

The formation of gas channels 26 through the optically transparent article 14 allows fluids such as gases (e.g., air or pressurized gases) to pass through the gas permeable window 10, from one side to another. Depending on a desired level of permeability through the gas permeable window 10, the diameter, number, and/or distance d between the gas channels 26 may be altered. The gas permeability of the article 14 may range between about 0.1 barrers to about 3000 barrers, or range between about 10 barrers and about 2000 barrers, or range between about 100 barrers to about 500 barrers. Quantified differently, as a system leak rate, the window 10 may have a permeability greater than about 5 PSI per hour, or greater than 10 PSI per hour, or greater than 20 PSI per hour. Under a pressure of about 1 atmosphere, the article 10 should deflect less than about 200 microns, more specifically less than about 100 microns, and even more specifically, less than about 50 microns.

In the depicted embodiment of FIG. 2A, the gas channels 26 extend in a direction orthogonal to each of the first and second surfaces 18, 22 through the optically transparent article 14. The gas channels are substantially cylindrical, but may take a variety of shapes including ellipse, triangular, square, or polygons having a greater number of sides. It should also be understood that the gas channels 26 may vary in shape across the window 10. The gas channels 26 are depicted as having a substantially uniform size, but may also vary in diameter between the first and second surfaces 18, 22 causing the gas channels 26 to taper through the article 14.

Referring now to the depicted embodiment of FIG. 2B, the gas channels 26 of the gas permeable window 10 vary in angle a with respect to an axis Z orthogonal to the first and second surfaces 18, 22. The angle by which the gas channels 26 vary from the orthogonal axis may range between about 0° to about 20°, or range between about 0.1° to about 15°, or range between about 0.1° to about 10°, In the depicted embodiment, the angle by which the gas channels 26 are tilted increases with increasing distance from a central region, or point, of the article 14. In other embodiments, the angle by which the gas channels 26 are tilted may change irrespective of the location on the article 14 or may form patterns. The slanting of the gas channels 26 may be done to facilitate the flow of gas through the article 14 and/or to minimize the production of artifacts in light transmitted through the article 14 from a point source located on one side of the gas permeable window 10.

Referring now to FIG. 2C, in some embodiments the optically transparent article 14 may include multiple optically transparent sheets 40. A plurality of the optically transparent sheets 40 may be bonded in assembly to form the optically transparent article 14. Each of the sheets 40 defines a plurality of holes 44. The holes 44, when the sheets 40 are in assembly, may be substantially aligned to form the gas channels 26. Embodiments where the article 14 is composed of multiple sheets 40 such as this are advantageous in that it allows for the processing of smaller components, yet still offers high aspect ratio gas channels 26. In should be understood that the gas channels 26 may also be drilled through the plurality of sheets 40 at an angle α relative to the orthogonal axis Z, similar to that described in connection with the embodiment shown in FIG. 2B.

Figure 3C:
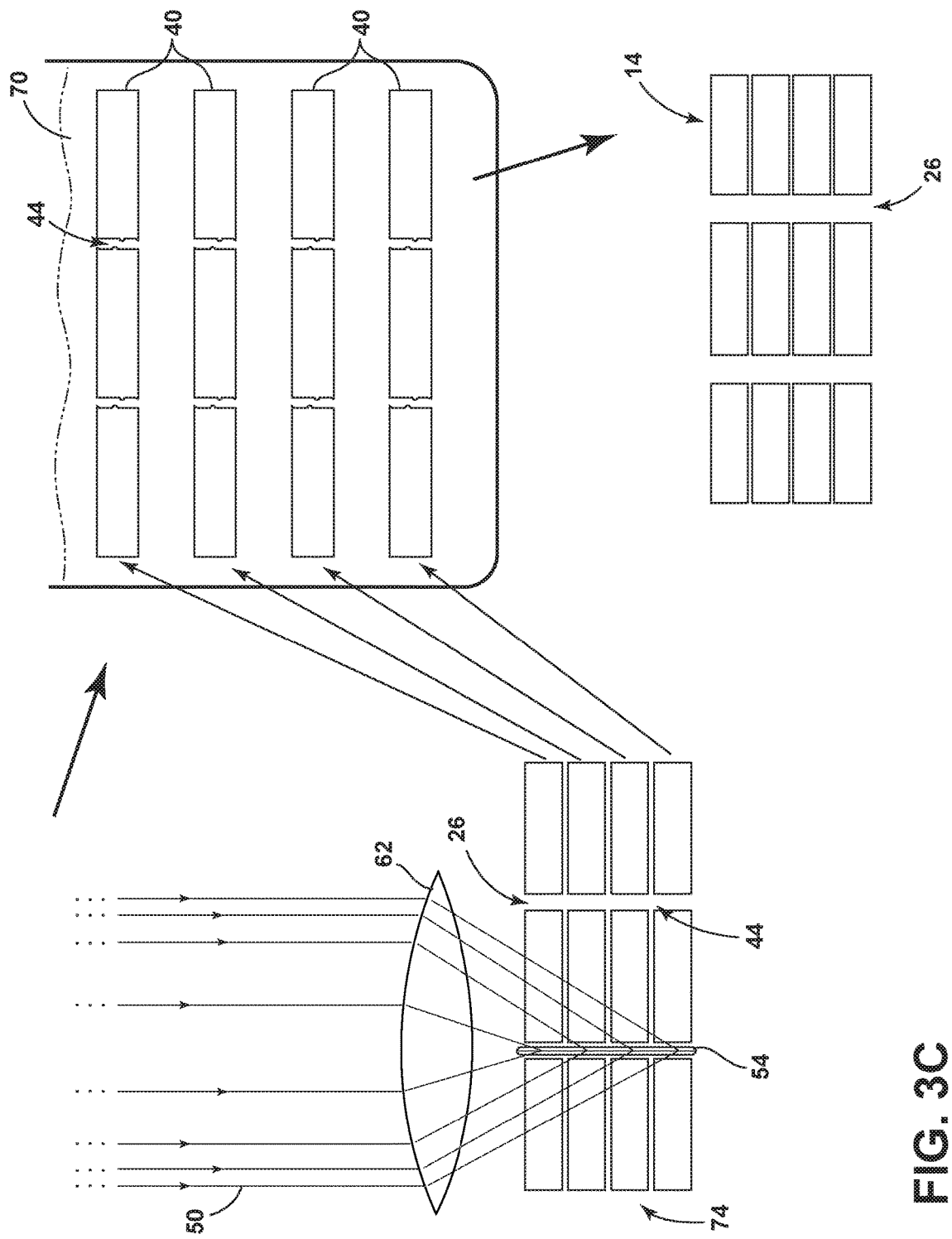
FIG. 3C is an illustration of a method of laser drilling the window, according to another embodiment.

Referring now to FIGS. 3A-C, according to one embodiment, an ultra-short pulsed laser may be used to create the gas channels 26 through the article 14 of the window 10. The details of the optical setup that enables the creation of the gas channels 26 are described below, and in U.S. application Ser. No. 61/752,489 filed on Jan. 15, 2013, the entire contents of which are incorporated herein by reference as if fully set forth herein. Additionally, U.S. application Ser. No. 14/530,410 filed on Oct. 31, 2014, is incorporated herein by reference as if fully set forth herein. The essence of the short-pulsed laser concept is to use an axicon lens element in an optical lens assembly to create a region of high aspect ratio gas channels 26 using ultra-short (picoseconds or femtosecond duration) Bessel beams. In other words, the axicon condenses the laser beam into a high intensity region that is generally cylindrical in shape and has a high aspect ratio in the body of the article 14. Due to the high intensity of the condensed laser beam, nonlinear interaction of the electromagnetic field of the laser and the material article 14 occurs and the laser energy is transferred to the article 14 to effect formation of defects that become constituents of the gas channels 26. However, it is important to realize that in the areas of the article 14 where the laser energy intensity is not high (e.g., article first surface 18, volume of the article 14 surrounding the central convergence line), the material is transparent to the laser and there is no mechanism for transferring energy from the laser to the material. Within the context of the present disclosure, a material is substantially transparent to the laser wavelength when the absorption is less than about 10%, and preferably, less than about 1% per millimeter of material depth at this wavelength. As a result, nothing happens to the article 14 in the regions where the laser intensity is below the nonlinear threshold.

Through use of the ultra-short pulsed laser, it is possible to create microscopic (e.g., in a range of between about 0.1 microns to about 0.5 microns in diameter, or in a range between about 0.1 microns to about 2.0 microns) gas channels 26 in the optically transparent article 14 using one or more high energy pulses or one or more bursts of high energy pulses. The gas channels 26 are regions of the article 14 material modified by the laser. The laser-induced modifications disrupt the structure of the article 14 material. Structural disruptions include compaction, melting, dislodging of material, rearrangements, and bond scission. The gas channels 26 extend into the interior of the article 14 and have a cross-sectional shape consistent with the cross-sectional shape of the laser (generally circular). In embodiments where the gas channels 26 have a different shape, the gas channel 26 may be formed via multiple pulses while moving the article 14 and/or laser. The average diameter of the as manufactured gas channels 26 may be in the range from about 0.1 microns to about 50 microns, or in the range from about 1 microns to about 20 microns, or in the range from about 2 microns to about 10 microns, or in the range from about 0.1 microns to about 5 microns. The disrupted or modified area (e.g, compacted, melted, or otherwise changed) of the material surrounding the gas channels 26 in the embodiments disclosed herein, preferably has a diameter of less than about 50 microns, and, more specifically, less than about 10 microns.

The individual gas channels 26 can be created at rates of several hundred kilohertz (several hundred thousand per second, for example). Thus, with relative motion between the laser source and the article 14, the gas channels 26 can be placed adjacent to one another and in whatever pattern desired. The spatial separation and the size of the gas channels 26 may be at least partly selected based on a desired permeability of the window 10.

Turning to FIGS. 3A and 3B, a method of laser drilling the article 14 includes focusing a pulsed laser beam 50 into a laser beam focal line 54, viewed along the beam propagation direction. The laser beam focal line 54 can be created by several ways, for example, Bessel beams, Airy beams, Weber beams and Mathieu beams (i.e, non-diffractive beams), whose field profiles are typically given by special functions that decay more slowly in the transverse direction (i.e. direction of propagation) than the Gaussian function. The laser (not shown) emits the pulsed laser beam 50 at a beam incidence side 58 of an optical assembly 62, the pulsed laser beam 50 being incident onto the optical assembly 62. The optical assembly 62 turns the incident laser beam into the laser beam focal line 54 on the output side over a defined expansion range along the beam direction (a length L of the focal line). The article 14 to be processed is positioned in the beam path after the optical assembly 62 and overlapping at least partially the laser beam focal line 54 of laser beam 50.

As FIG. 3A depicts, article 14 is aligned substantially perpendicularly to a longitudinal beam axis and thus behind the same focal line 54 produced by the optical assembly 62 (the substrate is perpendicular to the drawing plane) and viewed along the beam direction it is positioned relative to the focal line 54 in such a way that the focal line 54 viewed in beam direction starts before the first surface 18 of the article 14 and stops after the second surface 22 of the article 14, i.e. extending through the article 14. In the overlapping area of the laser beam focal line 54 with article 14, i.e. in the article 14 covered by focal line 54, the laser beam focal line 54 thus generates (in case of a suitable laser intensity along the laser beam focal line 54) a section 66 aligned with the longitudinal beam direction, along which an induced nonlinear absorption is generated in the article 14. The induced nonlinear absorption induces gas channel 26 formation in the article along section 66. The defect line formation is not only local, but extends over the entire length of section 66 of the induced absorption. It should be noted that although depicted as extending through the article 14, the focal line 54 may extend only partially into the article 14, thereby forming a gas channel 26 which does not extend between the first and second surfaces 18, 22. The average diameter or extent of the section of the induced absorption (or the sections in the material of article 14 undergoing the gas channel 26 formation) is labeled with reference D. The average extension D generally corresponds to the average diameter of the laser beam focal line 54, that is, an average spot diameter. It should be noted that due to localized heating and expansion of the article 14, micro-crack formation may take place because of the tension induced from the expansion of heated material, with the tension being the highest at the surface (e.g., first or second surface 18, 22) where the pulsed laser beam 50 contacts the article 14.

As shown in FIG. 3B, creating an angle between an orthogonal axis of the first and second surface article 14 and the pulsed laser beam 50 alters the angle at which the laser beam focal line 54 will be formed in the article 14. By altering the angle at which the beam focal line 54 contacts the article 14, the gas channel 26 may also be formed at an angle though the article 14 along section 66. The laser beam focal line 54 may be incident on the article 14 at an angle in the range of about 0° to about 20°, or in a range of about 0.5° to about 15°, or in a range of about 1° to about 10°.

In an alternative embodiment, the gas channels 26 may be formed in the article 14 via laser percussion drilling. Percussion drilling is performed using a laser having a suitable wavelength and intensity, the laser spot size determining the final hole size. Wavelengths that may be used range between about 100 nanometers to about 1070 nanometers, or in a range of about 150 nanometers to about 400 nanometers. In an exemplary embodiment, the laser may utilize an ultraviolet laser beam having a wavelength of about 355 nanometers. During drilling, the laser is focused to a Gaussian spot on a surface (e.g., the first or second surface 18, 22) of the article 14, the Gaussian spot having a diameter in the range of about 1 micron to about 20 microns, or in a range of about 3 microns to about 10 microns. The laser is pulsed to repetitively strike the same location on the article 14. The laser pulse duration may range between about 1 nanosecond and about 100 nanoseconds, or range between about 10 nanoseconds to about 25 nanoseconds. The laser may be capable of between about 50,000 pulses per second to about 150,000 pulses per second, more specifically about 100,000 pulses per second. With each pulse, a portion of material is removed from the article 14 and the gas channel 26 begins to form. As the gas channel 26 is formed in the article 14, the gas channel 26 confines the laser beam and creates a long thin hole through the article 14. The laser is pulsed until the gas channel 26 is of a desired depth (e.g., fully through the article 14) within the article 14 and the laser is shut off. The laser beam and article 14 are then moved relative to one another and the process repeated to form the next gas channel 26. Percussion drilling may allow the gas channels 26 may be tapered. For example, in an embodiment where the percussion drilling laser is incident on the first surface 18 of the article 14, the gas channel 26 may have an opening at the first surface 18 of about 15 to about 25 microns in diameter, and an opening on the second surface 22 of the article 14 having a diameter of about 5 microns to about 10 microns.

Regardless of the laser drilling method employed, after formation of the gas channels 26 it may be desirable to increase the diameters of, or to heal any micro-cracks present in, the gas channels 26. In one embodiment, a chemical etching process may be employed to widen the gas channels 26 and heal any micro-cracks or areas of mechanical weakness that formed during laser drilling. An etchant 70 (FIG. 3C) may include hydrofluoric acid, nitric acid, hydrochloric acid, potassium hydroxide, sodium hydroxide, and/or combinations thereof. In an exemplary embodiment, the etchant may include about 5% hydrofluoric acid, about 10% nitric acid, and the balance being water. The process is typically carried out by submersing the article 14 in a liquid solution of the etchant 70. By controlling the concentration of the acid, the temperature of the solution and the exposure time, the total amount of material removed from the article 14 can be adjusted. Additionally, the etching can be performed while agitating the article 14, or in the presence of ultrasound, to increase the fluid exchange inside the damage regions to lower the total amount of etching time.

As depicted in FIG. 3C, embodiments of the article 14 utilizing multiple optically transparent sheets 40 arranged in a stack may have the gas channels 26 formed in an expedited process. In a first step, the plurality of sheets 40 are arranged on top of one another to form a stack 74 positioned under the laser, and are then laser drilled according to one of the laser drilling methods outlined above to form a plurality of holes 44 through the sheets 40. During stacking, the sheets 40 may be marked with additional holes or fiducial markings to allow for reassembly of the stack 74 later. For example, one or more openings may be positioned at the edge of the sheets 40 and may be configured to accept a retaining pin that may be used during assembly and reassembly of the stack 74. Such a retaining pin would allow for quick and easy alignment of the sheets 40 within the stack 74. Each of the sheets 40 may have a thickness between about 0.1 millimeters and about 2.0 millimeters. In embodiments of laser drilling utilizing the laser beam focal line 54, the line 54 may extend through the entire stack of sheets 40 or only a portion of the sheets 40. For example, the focal line 54 may be positioned within the stack 74, pulsed, and moved downward though the stack 74. It should be understood that although FIG. 3C is depicted as using the ultra-short pulsed laser, laser percussion drilling may be used with similar results.

Once the first step is completed, a second step of separating the sheets 40 from one another is performed and the sheets 40 are etched in the etchant 70 as described above. Etching of the sheets 40 separately ensures that the liquid etchant 70 fully enters the holes 44 such that the healing and widening of the gas channels 26 is done evenly. Finally, after etching, the sheets 40 are cleaned and assembled to form the article 14. In embodiments where the article 14 is composed of multiple sheets 40, the article 14 may be held together via retaining pins or other suitable bonding and alignment techniques. Aligning of the sheets 40 causes the holes 44 to be substantially in alignment, thereby forming the gas channels 26. By utilizing this technique, proper etching of high aspect ratio gas channels 26 within the article 14 can be assured because there is less distance for the etchant 70 to flow through. Additionally, laser drilling the plurality of sheets 40 at the same time may provide a manufacturing advantage in increased throughput.

It should be understood that the laser drilling of the gas channels 26 may be performed on articles 14 before or after an ion-exchange process has been carried out on the article. Exemplary ion-exchange processes include alkali, alkali-earth, and/or transition metal doping of the article 14.

Figure 4A:
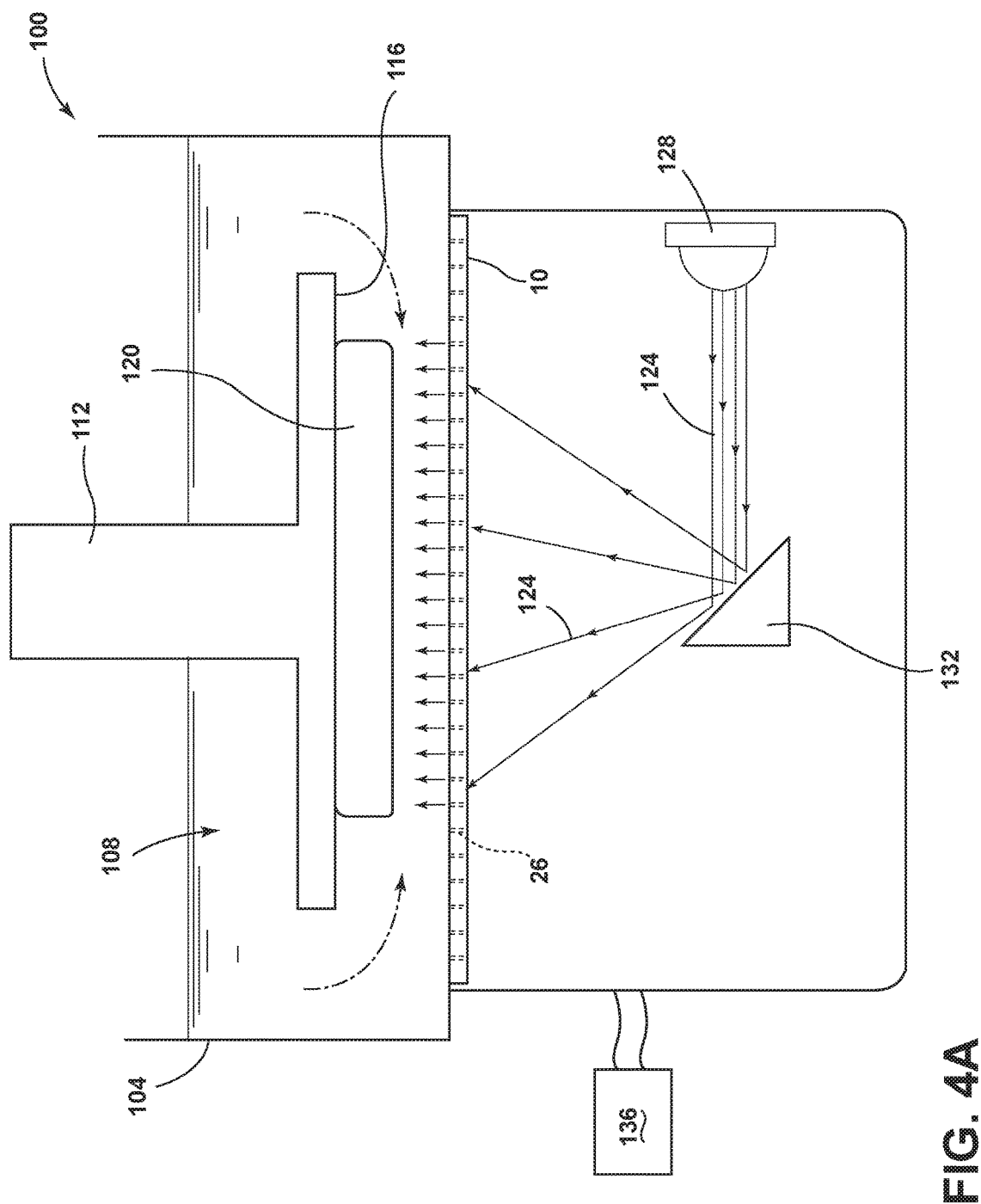
FIG. 4A depicts use of the window according to one embodiment.

Referring now to FIG. 4A, the gas permeable window 10 may be suitable for use in a liquid interface additive manufacturing device 100. In such an embodiment, the gas permeable window 10 may include a glass, glass laminates, and/or glass composites. In the depicted embodiment, the device 100 includes a housing 104 holding a bath 108 of liquid polymer. The device 100 has a mechanical stepper 112 which may be moved into and out of the bath 108. The mechanical stepper 112 includes a build surface 116 on which a polymeric part 120 may be grown. The gas permeable window 10 is positioned along a bottom portion of the housing 104 and allows ultraviolet light 124 from a light source 128, which has been reflected off of a mirror 132, to enter the bath 108. In some embodiments, the gas permeable window 10 may be held in place via mechanical clamps. In a specific embodiment, the gas permeable window 10 may have approximate dimensions from about 10.16 centimeters (4 inches) by 17.78 centimeters (7 inches) to about 22.86 centimeters (9 inches) by 40.64 centimeters (16 inches).

The light source 128 may be a projector coupled with a controller and a memory and configured to project an image with the ultraviolet light 124 of sections of a polymeric part 120 to be constructed. As a portion of the polymeric part 120 is formed on the build surface 116, the mechanical stepper 112 is advanced upward, moving the polymeric part 120 away from the gas permeable window 26 and allowing fluid in the bath 108 to flow between the polymeric part 120 and the gas permeable window 26. The light source 128 then projects a different image of the polymeric part 120 which causes the bath 108 to polymerize on the polymeric part 120 such that the next portion of the polymeric part 120 is formed. To prevent the polymeric part 120 from forming directly on the gas permeable window 10, the gas channels 26 allow a polymerization inhibiting gas (e.g., oxygen) to be passed into the bath 108 thereby forming a "dead zone" where the polymerization of the bath 108 does not take place. The polymerization inhibiting gas is supplied via a gas source 136. The gas source 136 may provide gas at a pressure in a range of about 0.1 atmospheres to about 10 atmospheres. By determining the desired rate of growth of the polymeric part 120, the thickness of the dead zone, and therefore the required amount of polymerization inhibiting gas introduced, may be determined. By varying the diameter and number of gas channels 26 disposed through the gas permeable window 10, the necessary permeability may be met to allow proper part 120 growth.

Figure 4B:
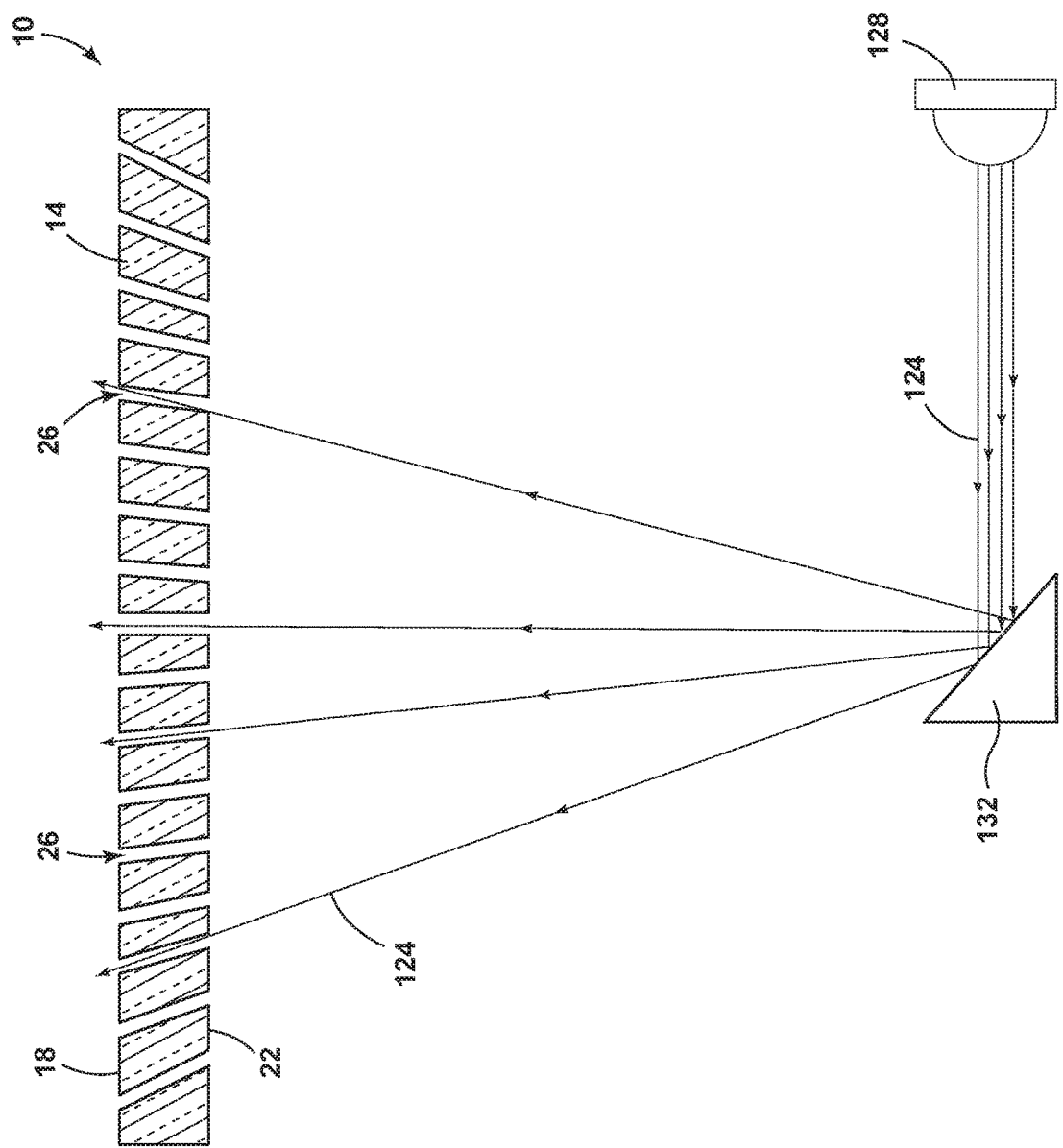
FIG. 4B is an enhanced view of the window according to an alternate embodiment.

As depicted in FIG. 4B and explained above, the gas channels 26 may be disposed at an angle through the article 14 of the gas permeable window 10. Such an angling allows for a greater transmittance of the ultraviolet light 124 through the window 10 because it is not attenuated by the glass article 14. Additionally, by aligning the gas channels 26 along the axis of the reflected ultraviolet light rays 124, less of the ultraviolet light 124 is scattered by the window 10 because it passes through the angled gas channels 26 without contacting the article 14. This is beneficial because as the ultraviolet light 124 is the mechanism by which the polymeric part 120 is shaped and grown, distortions to that light may result in optical artifacts being produced in the polymeric part 120.

In another embodiment, the gas permeable window 10 may be utilized in aeronautical applications where differential pressures across the gas permeable window 10 would desirably be minimized. For example, the gas permeable window 10 may form a pane of a dual pane window for an airplane. In such an embodiment, it would be desirable for gas trapped between the panes to be allowed to equalize with the air space of a cabin of the airplane such that the differential pressure does not cause the window to shatter or otherwise break.

It will be apparent to those skilled in the art that various modifications and variations can be made without departing from the spirit or scope of the claims.

What is claimed is:

1. A gas permeable glass window, comprising:
an optically transparent glass article greater than about 0.1 millimeters in thickness defining a first surface and a second surface; and
a plurality of gas channels disposed through the article from the first surface to the second surface, wherein:
the gas channels occupy less than about 1.0% of a surface area of the article,
the gas channels are configured such that the article has a gas permeability between about 10 barrers and about 2000 barrers, and
the gas channels are randomly distributed throughout the article and are spaced apart between about 5 microns and about 400 microns.

2. The gas permeable window of claim 1, wherein the gas permeability is between about 100 barrers and about 500 barrers.

3. The gas permeable window of claim 2, wherein the gas channels occupy less than about 0.05% of the surface area of the article.

4. The gas permeable window of claim 1, wherein the glass article comprises a plurality of stacked glass sheets, each glass sheet having a plurality of holes extending therethrough, and further wherein the glass sheets are stacked such that the holes are substantially aligned to form the gas channels.

5. The gas permeable window of claim 1, wherein the gas channels have an aspect ratio of between about 10:1 and about 12,000:1.

6. The gas permeable window of claim 1, wherein the gas channels have a diameter between about 0.25 microns and about 50.0microns and the gas permeability of the article is less than about 500 barrers.

7. The gas permeable window of claim 6, wherein the gas channels are disposed through the article at an angle between about 0° to about 15° relative to an axis orthogonal to the first and second surfaces.

8. The gas permeable window of claim 7, wherein the angle of the channels increases with an increasing distance from a central point.

9. A method of forming a gas permeable glass window, comprising:
providing an optically transparent glass article having a first surface and a second surface;
focusing a pulsed laser beam into a laser beam focal line, viewed along the beam propagation direction; and
forming a plurality of gas channels in the article by repeatedly directing the laser beam focal line into the optically transparent glass article at an angle of incidence to the first surface of the glass article such that: (i) the gas channels disposed in a central region of the article are disposed at an angle of about 0° relative to an axis orthogonal to the first and second surfaces, and the angle of the gas channels disposed outside the central region increases with an increasing distance from the central region; or (ii) the gas channels are randomly distributed throughout the article and are spaced apart between about 5 microns and about 400 microns, the laser beam focal line generating an induced absorption within the article, each induced absorption producing a gas channel along the laser beam focal line from the first surface to the second surface within the article, wherein:
a pulse duration of the pulsed laser beam is less than about 15 picoseconds, and
the number and diameter of the gas channels is determined based on a desired gas permeability through the article.

10. The method of claim 9, further comprising the step of enlarging the gas channels by applying an etching agent.

11. The method of claim 9, wherein the angle of incidence to the surface of the substrate is varied such that the gas channels are disposed through the article at an angle between about 0° to about 15°, the angle of the channels increasing with an increasing distance from a central point.

12. The method of claim 9, wherein the gas channels have an aspect ratio of between about 10:1 and about 12,000:1.

13. The method of claim 12, wherein the gas permeability of the article is between about 100 barrers to about 500 barrers.

14. A gas permeable window comprising:
an optically transparent article defining a first surface and a second surface; and a plurality of gas channels extending from the first surface to the second surface, wherein:

the gas channels disposed in a central region of the article are disposed at an angle of about 0° relative to an axis orthogonal to the first and second surfaces, and the angle of the gas channels disposed outside the central region increases with an increasing distance from the central region.

15. The gas permeable window of claim 14, wherein the gas channels have an aspect ratio of between about 10:1 and about 12,000:1 and occupy less than about 0.01% of a surface area of the article.

16. The gas permeable window of claim 15, wherein the optically transparent article comprises a plurality of stacked transparent sheets, each sheet having a plurality of holes extending therethrough, and further wherein the transparent sheets are stacked such that the holes are substantially aligned to form the gas channels.

17. The gas permeable window of claim 16, wherein the gas permeability of the article is greater than about 100 barrers.

18. The gas permeable window of claim 17, wherein the optically transparent article comprises a glass having at least one ion-exchange region.

* * * * *

UNITED STATES PATENT AND TRADEMARK OFFICE
CERTIFICATE OF CORRECTION

PATENT NO. : 10,525,657 B2
APPLICATION NO. : 15/078097
DATED : January 7, 2020
INVENTOR(S) : Sasha Marjanovic et al.

It is certified that error appears in the above-identified patent and that said Letters Patent is hereby corrected as shown below:

On the Title Page

Page 5, Column 1, item (56), Other Publications, Line 15, delete "EuropeTec" and insert -- EuropTec --, therefor.

Page 5, Column 1, item (56), Other Publications, Line 38, delete "pluse" and insert -- pulse --, therefor.

Page 6, Column 2, item (56), Other Publications, Lines 28-29, delete "Eelectropolishing" and insert -- Electropolishing --, therefor.

In the Claims

Column 10, Line 16 (approx.), Claim 6, delete "50.0microns" and insert -- 50.0 microns --, therefor.

Signed and Sealed this
Nineteenth Day of May, 2020

Andrei Iancu
*Director of the United States Patent and Trademark Office*